(12) United States Patent
Robinson

(10) Patent No.: US 6,887,029 B1
(45) Date of Patent: May 3, 2005

(54) ELECTRICALLY POWERED LOAD CART

(76) Inventor: Ronald O. Robinson, 6509 Summertime La., Watauga, TX (US) 76148

(*) Notice: Subject to any disclaimer, the term of this patent is extended or adjusted under 35 U.S.C. 154(b) by 187 days.

(21) Appl. No.: 10/154,256

(22) Filed: May 23, 2002

Related U.S. Application Data

(60) Provisional application No. 60/358,338, filed on Feb. 19, 2002.

(51) Int. Cl.[7] .................................................. B66F 9/16
(52) U.S. Cl. ...................................... 414/592; 414/812
(58) Field of Search ................................ 414/592, 598, 414/611, 639, 812, 641; 187/222, 230, 231

(56) References Cited

U.S. PATENT DOCUMENTS

| | | | |
|---|---|---|---|
| 3,485,314 A | * 12/1969 | Herr | 180/19.1 |
| 4,716,980 A | * 1/1988 | Butler | 180/19.2 |
| 4,919,233 A | * 4/1990 | Larsen et al. | 187/227 |
| 5,478,196 A | * 12/1995 | Avitan et al. | 414/814 |
| 5,547,035 A | 8/1996 | Berry | 180/19.2 |

FOREIGN PATENT DOCUMENTS

GB 2356624 * 5/2001

* cited by examiner

Primary Examiner—Eileen D. Lillis
Assistant Examiner—Charles A. Fox
(74) Attorney, Agent, or Firm—Bracewell & Patterson, L.L.P.

(57) ABSTRACT

A three-wheeled, electrically powered cart is provided for transporting items typically transported using a hand truck. The cart comprises a body section housing rechargeable batteries and a steerable load section that is hinged to the body section. An electric motor powers the front wheel for propelling the cart. The load section pivots about a generally vertical axis and has a movable load rack that pivots about a horizontal axis. A platform is located between the rear wheels for supporting a user during operation. In one embodiment, the width of the cart is approximately 24 inches, allowing the cart to pass through a typical doorway.

19 Claims, 4 Drawing Sheets

ELECTRICALLY POWERED LOAD CART

CROSS REFERENCE TO RELATED APPLICATIONS

Benefit is herein claimed of the filing date under 35 USC § 119 and/or § 120 and CFR 1.78 to U.S. Provisional Patent Application Ser. No. 60/358,338, filed on Feb. 19, 2002, entitled "Electrically-Powered Load Cart."

BACKGROUND OF THE INVENTION

1. Field of the Invention

This invention relates generally to electric vehicles and relates particularly to an electrically powered load cart.

2. Description of the Related Art

One person can use a hand truck or similar cart to transport items that are too heavy or bulky for that one person to carry from one location to another. The hand truck may also be used to carry multiple items at once, reducing the number of trips required to complete the task.

For moving very heavy items, it may be necessary to provide a self-propelled cart, allowing the operator to move items that are difficult to move with a manually powered hand truck or cart. One example of a powered hand truck is shown in U.S. Pat. No. 5,547,035 to Berry, the truck comprising a four-wheeled frame and a pivoting fork assembly. The front wheels of the frame pivot on different axes to provide steering, and the fork assembly pivots relative to the frame only on a horizontal axis. An operator stands on a platform at a rear portion of the frame and operates the truck with hand controls. However, the truck disclosed in the '035 reference is wide due to the configuration, preventing the truck from passing through narrow openings, such as a doorway. Therefore, there is a need for a powered hand truck or cart that has a configuration and size allowing the cart to pass through narrow openings.

BRIEF SUMMARY OF THE INVENTION

A three-wheeled, electrically powered cart is provided for transporting items typically transported using a hand truck. The cart comprises a body section housing rechargeable batteries and a steerable load section that is hinged to the body section. An electric motor powers the front wheel for propelling the cart. The load section pivots about a generally vertical axis and has a movable load rack that pivots about a horizontal axis. A platform is located between the rear wheels for supporting a user during operation. In one embodiment, the width of the cart is approximately 24 inches, allowing the cart to pass through a typical doorway.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE PREFERRED EMBODIMENT

Figure 1:
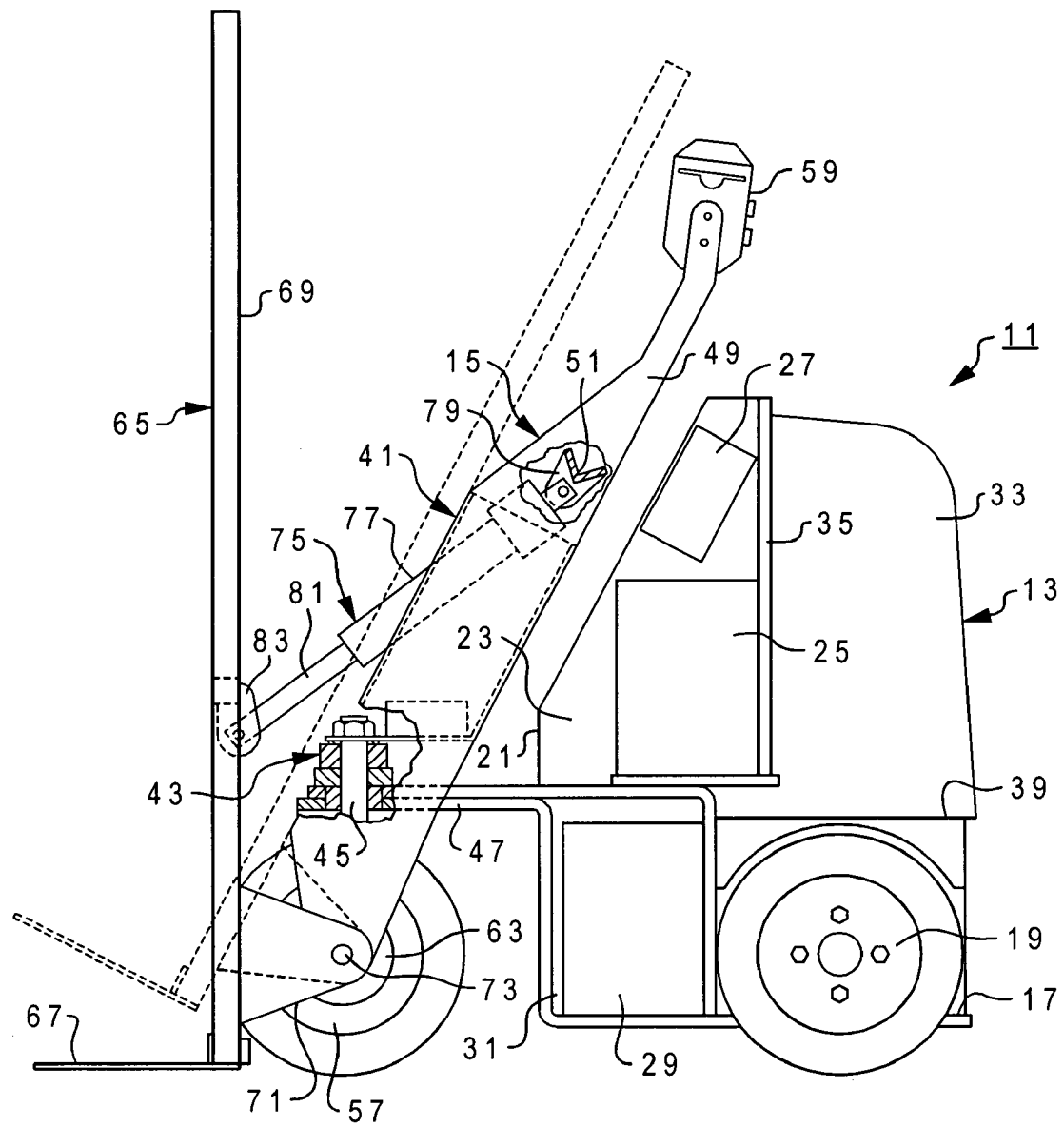
FIG. 1 is a side view of a load cart constructed in accordance with the present invention.
Figure 2:
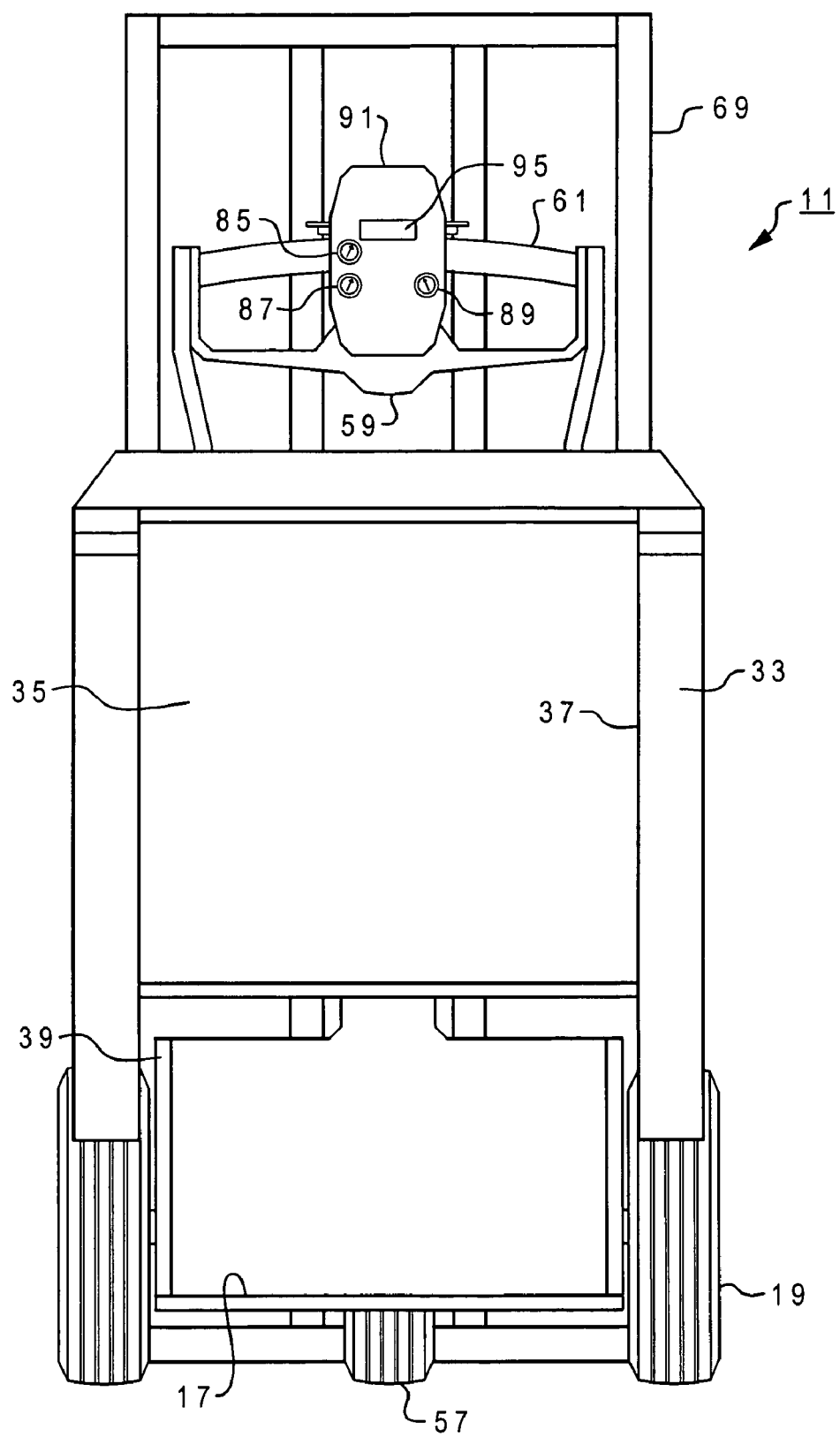
FIG. 2 is a rear view of the device of FIG. 1.
Figure 3:
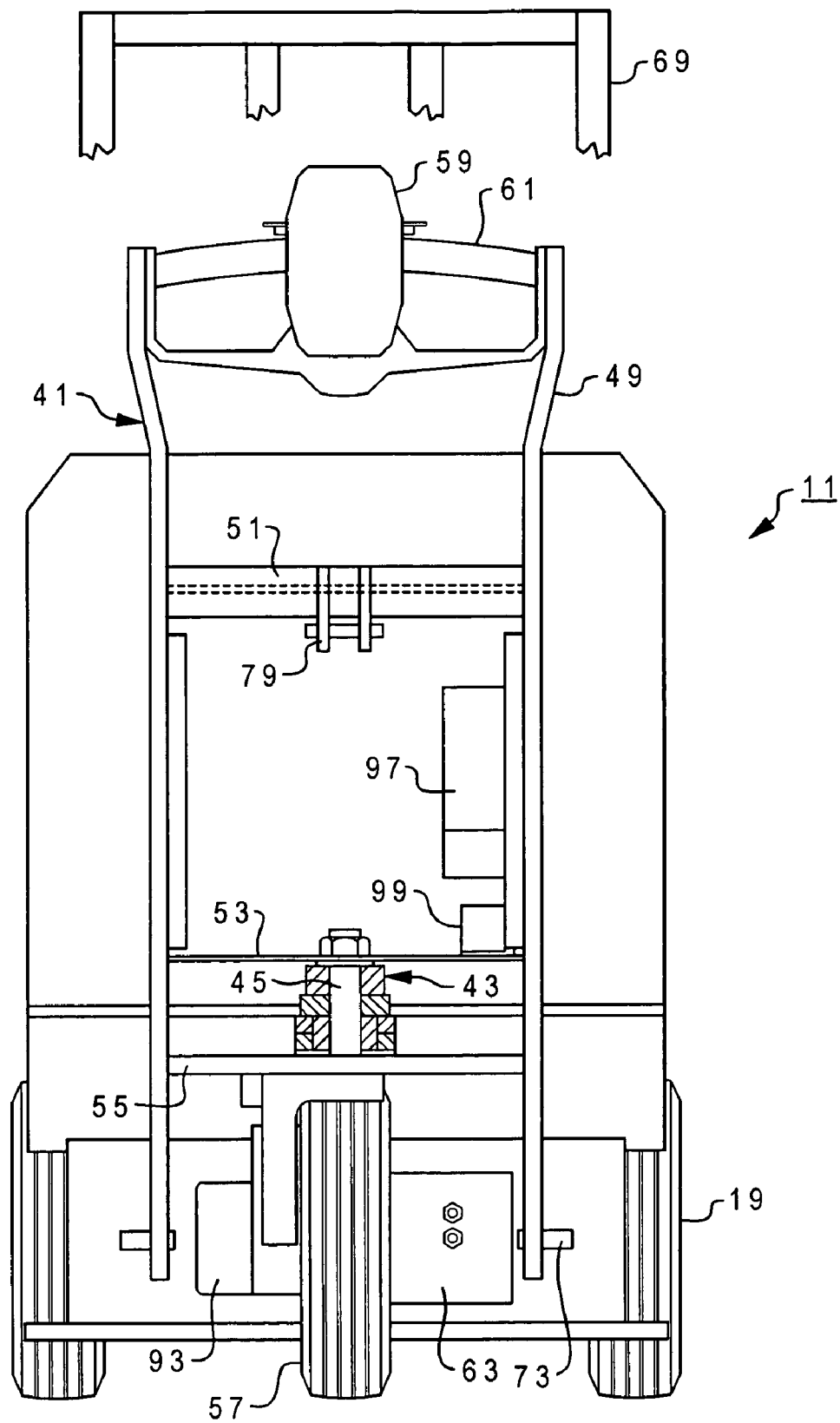
FIG. 3 is a front view of the device of FIG. 1.

FIGS. 1 through 3 illustrate a three-wheeled, electrically powered cart 11 for transporting items (not shown) typically transported using a hand truck, for example, cases of canned or bottled beverages. Cart 11 comprises a rear body section 13 and a front steerable load section 15 that is hinged to the forward portion of body section 13. The embodiment shown is capable of carrying approximately 400 pounds and has a width of approximately 24 inches, allowing cart 11 to pass through a typical doorway.

Referring to the figures, body section 13 provides for a rear portion of the rolling chassis of cart 11 and a platform 17 on which the operator stands during use of cart 11. Rear wheels 19 are symmetrically located to each side and at the rear of body section 13 for providing lateral stability to cart 11. Rear wheels 19 are not powered and rotate freely. Platform 17 is located below the axis of rotation of rear wheels 19.

Body section 13 has a battery cover 21 that encloses battery compartment 23, which houses battery 25 and battery charger 27. An additional battery 29 is located in a separate battery compartment 31 located below battery compartment 23. Batteries 25, 29 combine to provide 24 volts of electrical power to operate cart 11. Battery charger 27 may be connected to an electrical source for charging batteries 25, 29.

Body section 13 has two side panels 33 that extend rearward from vertical wall 35, wall 35 defining the rear extent of battery compartment 23. Side panels 33 are laterally separated to form a U-shaped enclosure in which the operator stands during while operating cart 11. The operator stands on platform 17 and between inner surfaces 37, which are visible in FIG. 2, of side panels 33. A wheel cover 39 is located on the inner side of each rear wheel 19 to prevent the operator from contacting wheels 19 during use of cart 11.

Load section 15 has an inclined, generally rectangular frame 41 attached to body section 13 with pivot assembly 43. Pivot assembly 43 includes a shaft 45 that extends vertically through plates 47, which form a tongue extending forward from the front portion of body section 13. A vertical frame 41 has two inclined frame members 49 that are connected by horizontal members 51, 53, 55. Members 53, 55 provide for a double-shear attachment of load section 15 to body section 13 at pivot assembly 43. Front wheel 57 is rotatably mounted between the lower portions of frame members 49. As load section 15 is pivoted about shaft 45, front wheel 57 rotates with frame 41 to provide for steering of cart 11. Though shaft 45 may be somewhat inclined relative to body section 13, having a vertical pivot axis allows a load carried on and rotating with load section 15 to remain at the same height through the range of motion of load section 15. This eliminates the extra force needed to lift the load over the pivot axis when load section 15 is connected to body section 13 with an inclined pivot axis.

An operation panel 59 is located between the upper portions of frame members 49 and is connected to members 49 by grips 61. The operator grasps grips 61 and operates cart 11 by applying a lateral force to steer load section 15 and manipulating buttons and/or switches on operation panel 59. Motor 63 is mounted to one side of front wheel 57, motor 63 propelling cart 11 in forward or reverse directions. Motor 63 is controlled by operation panel 59 and powered by batteries 25, 29.

A load rack 65 is located forward of frame members 49, load rack 65 having a horizontal plate 67 and a vertical support frame 69. In this embodiment, plate 67 is rigidly connected at a right angle to the lower portion of support frame 69. Extensions 71 extend rearward from support frame 69 and connect to frame 41 at pivots 73. Load rack 65 is rotatable about pivots 73 for moving load rack 65 from a loading/unloading, or lower, position (as shown in FIG. 1) to a transporting, or upper, position (shown in phantom in FIG. 1).

To rotate load rack 65 between positions, an electric piston actuator 75 is mounted between an upper portion of frame 65 and load rack 65. Cylinder 77 of actuator 75 is mounted at its upper end to bracket 79, which is mounted to member 51. Piston 81 of actuator 75 is mounted at its lower end to bracket 83 on support frame 69.

Referring to FIG. 2, operation panel 59 has controls for operating cart 11. In this embodiment, upper button 85 retracts piston 81 of actuator 75 for rotating load rack 65 into the transporting position, whereas lower button 87 extends piston 81 for rotating load rack 65 into the loading/unloading position. Button 89 operates a horn (not shown). An emergency stop button 91 activates a brake 93, shown in FIG. 3. Motor is operated using butterfly switch 95, the operator pressing one side of switch 95 to propel cart 11 forward and the other side of switch 95 to propel cart 11 rearward.

Referring to FIG. 3, brake 93 is shown located adjacent front wheel 57 and opposite motor 63. Controller 97 contains electronic components for controlling the operation and electrical systems of cart 11, controller 97 being connected to operation panel 59, motor 63, brake 93, and batteries 25, 29. A relay housing 99 contains relays for operating motor 63 and brake 93.

Referring to the figures, in operation, an operator loads items (not shown) on plate 67 of load rack 65, the items preferably placed against support frame 69. The operator stands on platform 17 and presses button 85 to rotate load rack 65 into the transport position. Operator then uses butterfly switch 95 to move cart 11 to the desired location and presses button 87 to rotate load rack 65 to the unloading position.

Figure 4:
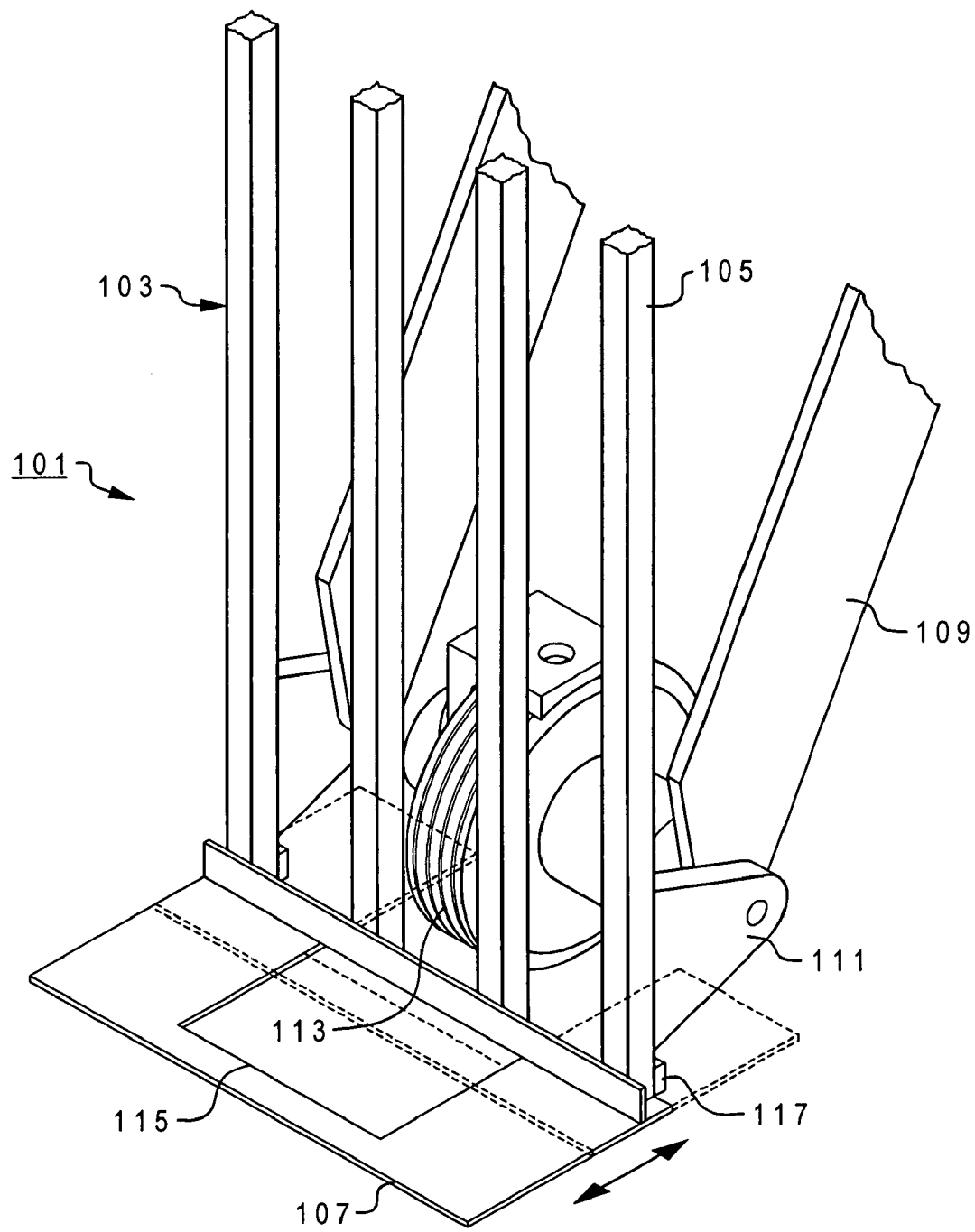
FIG. 4 is a perspective view of the front portion of a second embodiment of a load cart constructed in accordance with the present invention.

FIG. 4 shows the lower portion of a load section 101 for a second embodiment of the present invention. A load rack 103 comprises a support frame 105 and a load plate 107 that is generally perpendicular to support frame 105 and attached to the lower portion of support frame 105, load rack 103 being pivotally connected to frame members 109 with extensions 111. Wheel 113 is rotatably mounted between frame members 109. Load plate 107 is movably attached to support frame 105 and is movable relative to support frame 105 in a plane generally perpendicular to support frame 105. Load plate 107 is movable between a forward position, shown in solid lines, and a rearward position, shown in phantom. A cutout 115 is formed in the rear portion of load plate 107 to provide clearance for wheel 113 when plate 107 is moved to the rearward position. Load plate 107 is preferably moved using an electric device 117, such as a rack and pinion, though other means may be used to move plate 107.

The present invention provides for several advantages. By providing a load cart that can pass through typical doorways, the load cart of the invention can travel to most of the same locations as a hand truck. The invention can reduce the number of trips required to carry the desired load to its destination by carrying more weight on each trip. The load cart is easy to operate and provides safety features such as an emergency stop button and brake.

While the invention has been shown in only one of its forms, it should be apparent to those skilled in the art that it is not so limited, but is susceptible to various changes without departing from the scope of the invention. For example, the cart may be formed to have a stronger frame and a larger width for transporting higher-weight loads.

What is claimed is:

1. A powered load cart, comprising:
a body section having at least two wheels;
a steerable load section pivotally connected to a forward portion of the body section, the load section pivoting about an upright axis relative to the body section and having a wheel rotatably connected to the load section;
an operator control mounted to the load section and adapted to allow a user to pivot the load section for selecting a desired direction of travel of the cart;
a drive device for applying torque to at least one of the wheels for propelling the cart;
an operator platform located on the body section and adapted to support the user;
a load-supporting surface connected to the load section and pivoting with the load section relative to the body section as the user steers the load section; and wherein:
the load section comprises upright frame members that are laterally spaced from each other, the wheel of the load section being mounted to a lower portion of the frame members, the operator control being mounted to the frame members.

2. The cart of claim 1, wherein:
the wheel of the load section is mounted in a laterally centered position.

3. The cart of claim 1, further comprising:
a forward-extending tongue on the forward portion of the body section;
a crossmember connecting the frame members, the crossmember extending laterally between the frame members; and wherein
the load section is connected by a pin to the tongue of the body section, the pin extending through the crossmember and tongue.

4. A powered load cart, comprising:
a body section having at least two wheels;
a steerable load section pivotally connected to a forward portion of the body section, the load section pivoting about an upright axis relative to the body section and having a wheel rotatably connected to the load section;
an operator control mounted to the load section and adapted to allow a user to pivot the load section for selecting a desired direction of travel of the cart;
a drive device for applying torque to at least one of the wheels for propelling the cart;
an operator platform located on the body section and adapted to support the user;
a load-supporting surface connected to the load section and pivoting with the load section relative to the body section as the user steers the load section; and wherein:
the load-supporting surface is movably connected to the load section and is selectively movable between a first position to pick up a load of items and a second position to convey the items.

5. The cart of claim 4, wherein:
the load-supporting surface is rigidly connected to an upright support frame;
the load section comprises upright frame members, the wheel of the load section being mounted to a lower portion of the frame members, the operator control being mounted to the frame members, and the support frame contacts a forward edge of the frame members when the load surface and support frame are moved to the second position.

6. The cart of claim 4, wherein:
the drive device is an electric motor; and
the cart further comprises a battery compartment for carrying a battery to power the motor.

7. The cart of claim 4, wherein:
wherein the operator control comprises a handgrip for steering the load section and an electrical switch for operating the drive device.

8. A powered load cart, comprising:
a body section having at least two wheels;
a steerable load section pivotally connected to a forward portion of the body section, the load section pivoting about an upright axis relative to the body section and having a wheel rotatably connected to the load section;
an operator control mounted to the load section and adapted to allow a user to pivot the load section for selecting a desired direction of travel of the cart;
a drive device for applying torque to at least one of the wheels for propelling the cart;
an operator platform located on the body section and adapted to support the user;
a load-supporting surface connected to the load section and pivoting with the load section relative to the body section as the user steers the load section; wherein:
the load-supporting surface comprises a lower plate; and
the cart further comprises a linear actuator connecting the load-supporting surface and the load section, the actuator being actuable for pivoting the load-supporting surface relative to the load section between a first position, wherein the lower plate is horizontal, and a second position, wherein the load plate tilts rearward.

9. The cart of claim 8, wherein:
the linear actuator is an electric ram.

10. A powered load cart, comprising:
a body section having at least two wheels;
a steerable load section pivotally connected to a forward portion of the body section, the load section pivoting about an upright axis relative to the body section and having a wheel rotatably connected to the load section;
an operator control mounted to the load section and adapted to allow a user to pivot the load section for selecting a desired direction of travel of the cart;
a drive device for applying torque to at least one of the wheels for propelling the cart;
an operator platform located on the body section and adapted to support the user;
a load-supporting surface connected to the load section and pivoting with the load section relative to the body section as the user steers the load section; wherein:
the wheels of the body section are coaxial; and
the operator platform is located below an axis of the wheels and between the wheels.

11. A method of transporting items, comprising:
(a) providing a cart having a segmented, articulating body mounted on wheels, the body having a front section pivotally connected to a rear section, the front section pivoting about an upright axis and having upright frame members with a hand grip;
(b) loading items on a load rack mounted to the front section;
(c) tilting the load rack and the items rearward in relation to the front section;
(d) locating a user on an operator platform mounted on the rear section;
(e) supplying power from a power source mounted on the cart to apply torque to at least one of the wheels to cause the cart to move; and
(f) applying user-supplied force to the hand grip for manually pivoting the front section and load rack about the upright axis to select a direction of travel of the cart.

12. A powered load cart, comprising:
a body section having at least two wheels;
a steering section pivotally connected to a forward portion of the body section and pivoting about an upright axis relative to the body section, the steering section having at least two upright frame members that are laterally spaced from each other, a handgrip being connected to the frame members for gripping by a user to pivot the steering section about the upright axis, a wheel being connected to a lower portion of the frame members;
a drive device for applying torque to at least one of the wheels for propelling the cart;
an operator platform located on the body section; and
a load rack having a generally horizontal load plate and a generally vertical support frame rigidly connected to the load plate, the load rack being pivotally connected to the steering section and pivoting relative to the steering section about a horizontal axis between a first position with the load plate horizontal and a second position with the load plate and the support frame tilted rearward, the load rack pivoting with the load section about the upright axis relative to the body section.

13. The cart of claim 12, wherein:
the wheel of the steering section is mounted in a laterally centered position.

14. The cart of claim 12, further comprising:
a linear actuator connecting the load rack and the steering section, the actuator being actuable between a retracted position and an extended position for pivoting the load rack between the first and second positions relative to the steering section.

15. The cart of claim 12, wherein:
the support frame has a rearward edge that abuts a forward edge of the frame members when the load rack is moved to the second position.

16. The cart of claim 12, wherein:
the wheels of the body section are coaxial; and
the operator platform is located below an axis of the wheels and between the wheels.

17. The cart of claim 12, wherein:
the drive device is an electric motor; and
the cart further comprises a battery compartment for carrying a battery to power the motor.

18. The cart of claim 12, further comprising:
a forward-extending tongue on the forward portion of the body section;
a crossmember connecting the frame members, the crossmember extending laterally between the frame members; and wherein
the steering section is connected by a pin to the tongue of the body section, the pin extending through the crossmember and tongue.

19. The cart of claim 12, further comprising:
a control panel mounted adjacent the handgrip, the panel having an electrical switch to control the drive device, the switch being located within approximately three inches from the handgrip to allow manual actuation by the user without releasing the handgrip.

* * * * *